Figure 1:
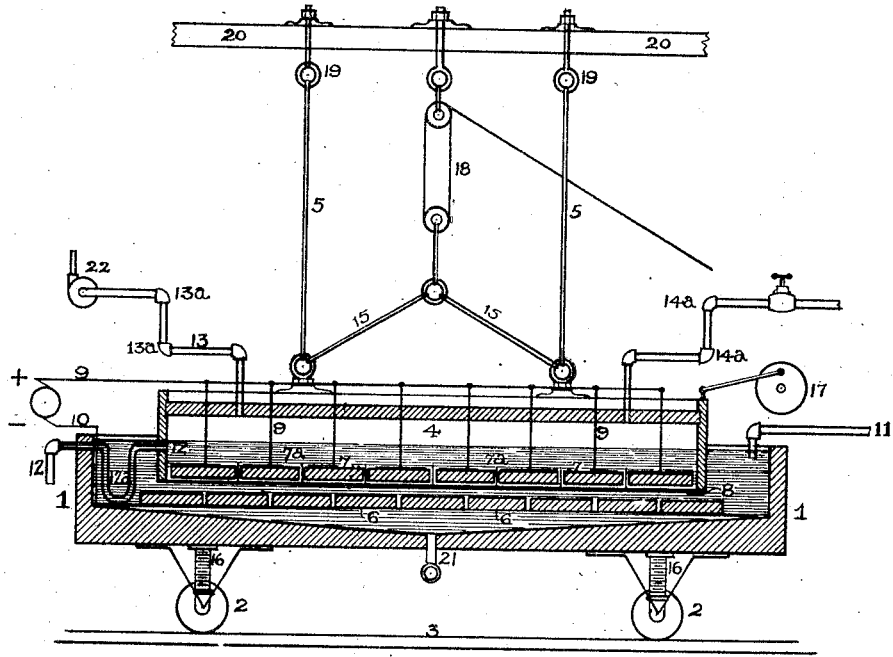

W. E. GREENAWALT.
ELECTROLYTIC APPARATUS.
APPLICATION FILED MAY 24, 1909. RENEWED JAN. 24, 1916.

1,183,188. Patented May 16, 1916.

WITNESSES:
Henry F. Sellers
Cord M. Greenawalt

INVENTOR.
William E. Greenawalt

UNITED STATES PATENT OFFICE.

WILLIAM E. GREENAWALT, OF DENVER, COLORADO.

ELECTROLYTIC APPARATUS.

1,183,188.  Specification of Letters Patent.  Patented May 16, 1916.

Application filed May 24, 1909, Serial No. 498,080. Renewed January 24, 1916. Serial No. 74,061.

*To all whom it may concern:*

Be it known that I, WILLIAM E. GREENAWALT, a citizen of the United States, residing at Denver, in the county of Denver and State of Colorado, have invented certain new and useful Improvements in Electrolytic Apparatus.

The anode products may be either primary, as chlorin, liberated in the electrolysis of chlorids, or secondary, as oxygen, liberated in the electrolysis of copper sulfate. In the electrolytic decomposition of copper sulfate, for example, the reaction may be represented as follows:—

(1) $CuSO_4 + \text{electric current} = Cu + SO_4$
(2) $SO_4 + H_2O = H_2SO_4 + O$ The oxygen so released is accompanied by considerable ozone, especially if a high current density is employed. The oxygen and ozone so produced is collected and used in the treatment of ores to facilitate the solution of the metals. If the ore to be treated is amenable to the cyanid process for the extraction of the precious metals, the oxygen, or air containing ozone may be used and thereby obtain an extraction impracticable with the ordinary method of procedure. It is well known that in the treatment of ores by the cyanid process, oxygen plays an important part in the efficiency of the treatment, as shown by the following equations:—

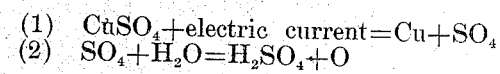

(3) $4Au + 8KCy + 2H_2O + O =$
$4KAuCy_2 + 4KOH$
(4) $2Ag + 4KCy + H_2O + O =$
$2KAgCy_2 + 2KOH$

While oxygen, therefore, is necessary for the solution of the precious metals, ozone is vastly more efficient. The aeration of ore or cyanid solution with oxygen or air containing ozone greatly facilitates and cheapens the process of solution. It is well known also, that ozone is an efficient oxidizer, and substances, such as tellurids, will yield to oxidation under the influence of ozone which would remain unaltered by ordinary air or oxygen. By the judicious use of ozone, therefore, a close extraction of gold and silver can be made on raw tellurid ores and thus save the additional cost of roasting I have found that in the electrolysis of copper sulfate, a great deal of ozone is produced when high current densities are employed, and that with the electrolyzer shown in the accompanying drawings, the ozone can be cheaply produced and effectively collected, and applied to the ore or solutions.

It is my object therefore, in collecting the oxygen, ozone, chlorin, or other gaseous elements capable of benefiting the ore, to withdraw it from the electrolyzer and apply it to the ore, either directly in the gaseous condition, or by absorption in water, or as the products of secondary reactions. The detailed method of applying it is immaterial.

Figure 2:
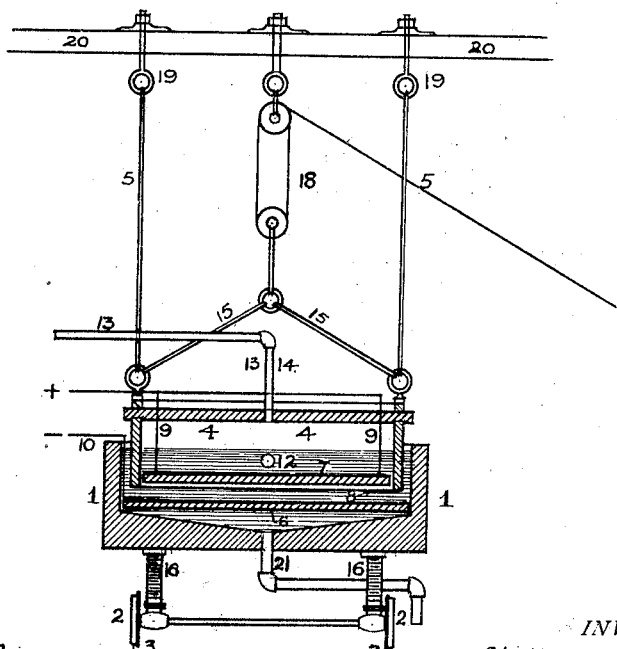

Referring to the accompanying drawings, Figure 1 represents a longitudinal section through the electrolyzer and Fig. 2 a transverse section.

In the figures 1 represents a shallow tank, preferably mounted on wheels 2, and running on tracks 3.

4 is an inverted tank, or anode bell, suspended by rods, ropes or chains 5, and dipping below the surface of the electrolyte contained in tank 1. The anode bell in this way is partially immersed in the electrolyte and forms a sealed chamber for the collection of the anode gases.

6 represents the cathode in tank 1 and 7 the anodes in the suspended anode bell 4.

It will ordinarily not be necessary to use a diphragm, but if one is employed it is stretched over the mouth of the anode bell between the anodes and cathodes as shown at 8.

9 are leading in rods to the anodes, and 10 similar rods connecting with the cathodes.

The material of the electrodes will depend on the nature of the electrolyte. The anodes are arranged with a space or opening between them to permit the electrolyte and released gases to enter the anode compartment. The cathodes may be similarly arranged if the deposited metal is loose or granular, but if the deposit is firm and regular a single thin cathode sheet in the bottom of a flat tank will do best.

11 is a pipe connecting with the source of solution supply, and 12 the exhaust pipe for the electrolyzed solution from the anode compartment.

The electrolyte, as for example in the deposition of copper, will ordinarily be introduced into the cathode tank flow over and about the electrodes, and issue from the anode compartment, regenerated in acid but deprived of much of its copper. If the electrolyte is copper sulfate, copper is deposited on the cathode, while the acid is regenerated, and oxygen released at the same time as shown by equations 1 and 2, but containing much ozone. The regenerated acid solution is then returned to the ore to dissolve more copper, while the oxygen, containing more or less ozone, is applied to the ore to facilitate the extraction of the precious metals. If it is desired to dilute the oxygen or ozone, this may be done by introducing air into the anode bell through the pipe 14.

The electrolytic apparatus is designed to have the electrodes as close as possible. Owing to the anodes being placed vertically over the cathodes, the anode gases will immediately rise through the electrolyte and enter the anode bell without coming in contact with the deposited metal at the cathode. In some electrolytic work this is an important matter. The rising of the anode gases is also facilitated by the oscillation of the anode bell. In the electrolysis of copper sulfate or of copper chlorid solutions with insoluble anodes, the distance between the electrodes need only be about one half inch. In order to prevent sprouting and consequent short circuiting of the electric current, the anode bell is mounted on flexible suspenders, 5, so as to give a small amplitude of oscillation and thus prevent the deposited metal from building up too rapidly in one place. This may be further assured by placing brushes, such as thin pieces of board, 7$^a$, in the anode spaces which will sweep the deposited copper into the pocket of the cathode tank. It is assumed that with the high current density employed, say from 50 to 200 amperes per square foot, that the deposited metal will be loose and easily brushed from the surface of the cathode. The oscillation of the anode bell, agitates the electrolyte, and also tends to equalize the deposited metal on the cathode, as well as facilitating the escape of the gases released at the anode.

The cathode tank, mounted on wheels, may also be used to equalize the deposit and to agitate the electrolyte, but is more particularly mounted on wheels for the purpose of removing the deposited metal. When it is desired to remove the deposited metal from the cathode tank, the anode bell may be elevated by means of pulleys or hoist as shown at 15 and 18, and the cathode tank wheeled from under it to remove the metal, while another cathode tank from which the metal has been removed, may be wheeled in its place, and after the anode bell is again lowered, the electrolysis proceeds as before. Instead of elevating the anode bell it would be quite feasible to lower the cathode tank by means of screws 16. These screws may also be used to regulate the thickness of deposited metal on the cathode.

The suspenders for the anode bell are made adjustable by means of screws 19, going through the supports 20. The adjustable feature of the electrolyzer, is quite an important matter, because the space between the electrodes may be regulated at will, even while the electrolyzer is in operation, and if the metal deposited on the cathode is firm the anode may be gradually elevated, as the cathode is built up by deposited metal. In this way there will be great economy in operation, since the metal may be deposited on the cathode to any thickness desired before it will be necessary to replace the original cathode sheet.

When the cell is in operation the solution to be electrolyzed is introduced into the cathode tank through pipe 11. The current, entering the leading in rods marked +, passes to the anodes, 7, passes through the electrolyte to the cathodes 6, and leaves the electrolyzer through the rods marked —. The electrolyte, entering the cell at 11, passes over the cathodes, is electrolyzed and passes with the liberated gases through the space between the anodes, and leaves the anode bell by the exit 12, while at the same time the gases are withdrawn through the exit 13. If it is desired to dilute the anode gases, air may be introduced through the pipe 14. While the electrolysis is going on the anode compartment, suspended by flexible supports 5, oscillates like a pendulum, actuated by the mechanism 17. The power required for this purpose is trifling. When the deposited metal is loose or granular, it is desirable to have pockets below the cathodes into which the metal may be brushed, and where it is allowed to accumulate until it is desired to remove it. When the loose metal is to be removed it is washed through the opening 21 in the bottom of the cathode tank, by means of a stream of water or solution, into a settling tank, from which the solution or water may be decanted from the metal. The outlet pipes and inlet pipes 12, 13, and 14 all have flexible connections, 12$^a$, 13$^a$ and 14$^a$, between the oscillating anode bell, and stationary object. The electrolyzed and regenerated solution may again be returned to the ore. The application of the anode gases, such as oxygen, ozone or chlorin to the ore is best accomplished by withdrawing the gases from the anode bell by means of a pump, aspirator, exhauster or compressor, 22 and forced through the ore, either in the form of gas, or as the gas dissolved in water. The methods of applying the gases in the treatment of ores is so familiar that a detailed description or illustration is unnecessary. If the released gas is oxygen containing ozone, and the ore to be treated contains precious metals extractable by the cyanid process, the metals may be quickly and thoroughly recovered by agitating the ore slime or pulp in the cyanid solution, with the oxygen and ozone from the anode bell. The oxygen and ozone is preferably diluted with air for this purpose, as already described, and repeatedly passed through the ore until consumed.

It is evident that the apparatus is exceedingly well adapted to the decomposition of metal chlorids, chlorin being obtained in the anode bell while the metal is deposited on the cathode. The chlorin may then be applied, as in the case of oxygen or ozone, to the ore by any of the well known methods.

I claim:—

1. In apparatus for the electrolytic decomposition of metal solutions, the combination of a cathode tank containing the electrolyte, and anode bell suspended within the cathode tank partially immersed in the electrolyte and free to move horizontally relatively to the cathode.

2. In electrolytic apparatus for the decomposition of metal solutions, the combination of a cathode tank containing the electrolyte: an anode bell suspended within the cathode tank and partially immersed in the electrolyte, and means of oscillating the anode bell horizontally relatively to the cathode.

3. In electrolytic apparatus the combination of a cathode tank containing the electrolyte: an anode bell suspended within the cathode tank and partially immersed in the electrolyte; means of oscillating the anode bell horizontally, and means of adjusting the distance vertically between the electrodes.

4. In electrolytic apparatus the combination of a cathode tank containing the electrolyte; an anode bell suspended within the cathode tank and partially immersed in the electrolyte; means of oscillating the anode bell horizontally, and means of varying the vertical distance between the cathode tank and anode bell.

5. In electrolytic apparatus the combination of a tank containing the electrolyte; a bell suspended within the tank and partially immersed in the electrolyte, and means of oscillating the suspended bell relatively to the electrolyte tank.

6. In electrolytic apparatus the combination of a cathode tank containing the electrolyte; an anode bell suspended within the cathode tank and partially immersed in the electrolyte and free to move horizontally relatively to the cathode, and diaphragm stretched over the mouth of the anode bell and oscillating with it.

7. In electrolytic apparatus the combination of a tank containing the electrolyte; a bell suspended within the cathode tank and partially immersed in the electrolyte; electrodes suitably arranged in the tank and in the bell; means of oscillating the suspended bell, and diaphragm interposed between the electrodes.

8. In apparatus for the electrolytic decomposition of metal solutions, the combination of a cathode tank containing the electrolyte; an anode bell suspended within the cathode tank and partially immersed in the electrolyte; means of introducing the solution to be electrolyzed into the cathode tank, and outlet pipe for the withdrawal of the electrolyzed solution from the anode bell, passing through the solution in the cathode tank and through the walls of the cathode tank.

9. In apparatus for the electrolytic decomposition of metal solutions, the combination of a cathode tank containing the electrolyte; an anode bell suspended within the cathode tank and partially immersed in the electrolyte; means of oscillating the anode bell; means of introducing the electrolyte into the cathode tank, and flexible outlet pipe for withdrawing the electrolyzed solution from the anode bell passing through the electrolyte in the cathode tank.

10. In electrolytic apparatus, the combination of a cathode tank containing the electrolyte; an anode bell suspended within the cathode tank and partially immersed in the electrolyte; means of introducing the solution to be electrolyzed into the cathode tank; outlet pipe for the withdrawal of the released gases during electrolysis, and solution outlet pipe having means of trapping the solution to prevent the admittance of air into the anode bell, passing through the electrolyte in the cathode tank.

11. In apparatus for the electrolytic decomposition of metal solutions, the combination of a cathode tank containing the electrolyte; an anode bell suspended within the cathode tank and partially immersed in the electrolyte; means of withdrawing the electrolyzed solution from the anode bell and passing it through the catholyte without mingling with it, and means of trapping the solution to prevent the admittance of air into the anode bell.

12. In electrolytic apparatus, the combination of a cathode tank containing the electrolyte; an anode bell suspended within the cathode tank and partially immersed in the electrolyte; horizontal cathodes in the cathode tank; horizontal anodes attached to the anode bell and suspended over the cathodes, and means of oscillating the anode bell horizontally so that the anodes and cathodes will remain substantially the same distance apart.

13. In electrolytic apparatus the combination of a cathode tank containing the electrolyte; an anode bell suspended within the cathode tank and partially immersed in the electrolyte; means of introducing a gaseous substance into the anode bell, and means of withdrawing the gaseous substance so introduced and the anode gases from the cell.

14. In electrolytic apparatus the combination of a cathode tank containing the electrolyte; an anode bell suspended within the cathode tank and partially immersed in the electrolyte; means of introducing the electrolyte into the cathode tank; means of withdrawing the electrolyte from the anode bell without mixing with the electrolyte in the cathode tank, and means of withdrawing the liberated gases from the anode bell, and means of oscillating the anode bell.

15. In electrolytic apparatus the combination of a tank containing the electrolyte and electrodes of one sign, and bell containing the electrodes of opposite sign suspended within the electrolyte tank, and which is free to move horizontally and capable of being adjusted vertically.

16. In electrolytic apparatus the combination of a cathode tank containing the electrolyte and horizontal cathodes; an anode bell suspended within the cathode tank and containing horizontal anodes; means of adjusting the vertical distance between the cathodes and anodes; means of introducing the solution into the cathode tank; a tube for withdrawing the electrolyzed solution from the anode bell without mixing with the solution in the cathode tank, and means of withdrawing the anode gases from the anode bell.

17. In electrolytic apparatus the combination of a cathode tank containing the electrolyte and horizontal cathodes; an anode bell suspended within the cathode tank, partially immersed in the electrolyte and containing horizontal anodes substantially parallel to the horizontal cathodes; means of adjusting the vertical distance between the anodes and cathodes; diaphragm interposed between the electrodes; means of introducing the solution into the cathode tank; means of withdrawing the solution from the anode bell without mingling with the cathode solution, and means of withdrawing the released gases from the anode bell.

18. In electrolytic apparatus the combination of a tank adapted to contain the electrolyte and containing electrodes of one sign; a bell suspended within the said tank, partially immersed in the electrolyte and containing electrodes of the opposite sign, and means of oscillating the bell substantially parallel to the electrodes in the electrolyte tank.

19. In electrolytic apparatus an oscillating anode bell in combination with an oscillating anode.

20. In electrolytic apparatus having an oscillating diaphragm and an oscillating electrode, a space arranged for the free circulation of the electrolyte between the diaphragm and the oscillating electrode.

21. In electrolytic apparatus the combination of a tank containing the electrolyte and horizontal and stationary cathode; a horizontal anode suspended within the electrolyte tank and substantially parallel with the cathode; an anode suspended by flexible suspenders from pivotal points over the electrolyte tank, and means of oscillating the anode relatively to the cathode.

22. In electrolytic apparatus for the decomposition of metal solutions the combination of a tank containing the electrolyte and horizontal and stationary cathode; a horizontal anode suspended within the electrolyte tank substantially parallel with the cathode and capable of moving horizontally; flexible supports suspending the anode within the electrolyte tank, and means of oscillating the anode parallel with the cathode.

23. In electrolytic apparatus for the decomposition of metal solutions the combination of a tank containing the electrolyte and horizontal and stationary cathode; a horizontal anode suspended within the electrolyte tank and substantially parallel with the cathode and capable of moving horizontally; a support for the anode located at some distance above the electrolyte tank; means of suspending the anode from said support from fixed pivotal points, and means of oscillating the anode horizontally and substantially parallel with the cathode.

24. In electrolytic apparatus for the decomposition of metal solutions the combination of a tank containing the electrolyte and horizontal and stationary cathode; a horizontal anode suspended within the electrolyte tank and substantially parallel with the cathode and capable of moving horizontally; a support for the anode located at some distance above the electrolyte tank; means of suspending the anode from said support from fixed pivotal points; means of oscillating the anode horizontally and substantially parallel with the cathode, and means of adjusting the vertical distance between the electrodes.

25. In electrolytic apparatus the combination of a tank containing the electrolyte and electrodes of one sign; a bell containing the electrodes of the opposite sign suspended within the electrolyte tank from fixed pivotal supports; means of oscillating the electrode bell, and means of withdrawing the electrolyte from the electrode bell without mingling with the electrolyte in the electrolyte tank.

26. In electrolytic apparatus an oscillating anode in combination with an oscillating diaphragm suspended from fixed pivotal points.

WILLIAM E. GREENAWALT.

Witnesses:
FRED PATEE,
THOMAS C. HUGHES.